United States Patent Office.

HANS KUZEL, OF HÖCHST-ON-THE-MAIN, GERMANY, ASSIGNOR TO THE FARB- WERKE, VORMALS MEISTER, LUCIUS & BRÜNING, OF SAME PLACE.

PROCESS OF MAKING NAPHTHOSULTONDISULPHONIC ACID.

SPECIFICATION forming part of Letters Patent No. 473,467, dated April 26, 1892.

Application filed June 30, 1891. Serial No. 398,043. (Specimens.) Patented in Germany February 1, 1890, No. 56,058, and in France June 17, 1890, No. 206,439.

*To all whom it may concern:*

Be it known that I, HANS KUZEL, doctor of philosophy, a citizen of the Empire of Germany, residing at Höchst-on-the-Main, in the Empire of Germany, have invented certain new and useful Improvements in the Production of Naphthosultondisulphonic Acid; and I do hereby declare the following to be a full, clear, and exact description of the invention, such as will enable others skilled in the art to which it appertains to make and use the same.

My invention relates to the production of naphthosultondisulphonic acid in the form of its salts, a derivative of the naphthosulton. (*Ber. d. Deutsch Chem. Ges.* 20, p. 3,162.)

Letters Patent for this my invention were taken out in Germany, No. 56,058, dated February 1, 1890, and in France, No. 206,439, dated June 17, 1890, in the name of Dr. Hermann Koch.

In carrying out my invention I proceed from the naphthalintrisulphonic acid, obtained as described in the German Letters Patent No. 38,281, which acid, by nitration and reduction, furnishes a novel naphthalintrisulphonic acid. This latter acid can be converted, by treatment with nitrous acid and subsequent boiling with acidulated water, into the naphthosultondisulphonic acid—that is to say, the anhydride of a novel naphtholtrisulphonic acid. The naphthalintrisulphonate of sodium is dissolved in the quadruple quantity of concentrated sulphuric acid. To this solution or to the product of sulphonization obtained directly from naphthalin and fuming sulphuric acid is added by degrees the necessary quantity of concentrated nitric acid or of saltpeter, and then, in order to complete the reaction, the whole is heated on a water-bath. The product thus obtained is diluted with water, and there is then added while heating the necessary quantity of iron chips. After the reduction is completed it is sursaturated with lime and the liquid filtered off from the gypsum is evaporated. The novel naphthylaminetrisulphonic acid is distinguished from the two isomers before produced by not showing any fluorescence in alkaline solution and by forming a non-colored diazo compound, whereas the diazo compounds of its two isomeric acids are colored yellow.

The best way of producing the novel naphthosultondisulphonic acid is in the form of its sodium salt by sursaturating largely the solution of the sodium salt of the new naphthylaminetrisulphonic acid with sulphuric acid, adding the necessary quantity of nitrite, and boiling until the development of nitrogen ceases. If, however, after the decomposition of the diazo compound the not too largely diluted liquid is left to repose, there will crystallize out after some time the neutral sodium salt of the naphthosultondisulphonic acid—

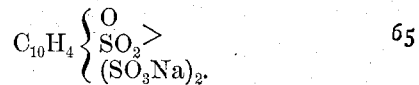

I have not succeeded in producing the free acid. The disodium salt is in form of small needles united to bases and does not show any fluorescence in aqueous solution. The aqueous solution is without color and is not blued on the addition of ferric chloride, as is the case for the corresponding naphtholtrisulphonic acid. Treated with concentrated ammonia it is converted into the sulphamide—

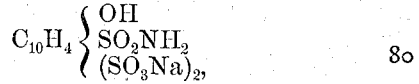

or its ammonia salt.

This novel naphthosultondisulphonic acid, on treatment with hot water or hot diluted alkalies or acids, furnishes a naphtholtrisulphonic acid not heretofore known. If the naphthosultondisulphonic acid or the naphtholtrisulphonic acid mentioned above is heated with caustic alkalies until a sample dissolved in water shows a strong violet fluorescence, there will have been formed the dioxynaphthalindisulphonic acid, technically called "chromotrop acid." The naphtholtrisulphonic acid mentioned can be reconverted into the naphthosultondisulphonic acid by treatment with concentrated or fuming sulphuric acid, or by other deshydrating agents. By the action of diazo bodies upon the naphtholtrisulphonic acid or the naphtholtrisulphonic acid monamide, in presence of an alkali or acetate of soda, a very beautiful and solid coloring-matter is formed.

Having thus described my invention and in what manner it can be performed, what I claim as new and my invention is—

1. The process for the production of naphthosultondisulphonic acid, which consists in nitrating the naphthalintrisulphonic acid herein described, reducing the nitro compound, converting the naphthylaminetrisulphonic acid thus formed into the diazo compound, and boiling this compound with acidulated water until the development of nitrogen ceases, substantially as set forth.

2. As a new article, the naphthosultondisulphonic acid, of which the neutral disodium salt crystallizes in the front of the colorless needles and does not show any fluorescence in aqueous solution, but treated with concentrated ammonia it is converted into a sulphamide of the formula:

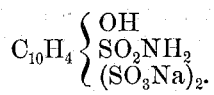

The neutral sodium salt is of easy solubility in water. On the addition of alcohol it is precipitated from its concentrated solution in the form of flocks, in absolute alcohol it is almost insoluble, and in ligroin it does not dissolve at all, and it has the formula:

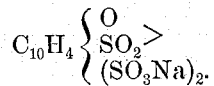

In testimony whereof I affix my signature in presence of two witnesses.

HANS KUZEL.

Witnesses:
JOSEF REVERDY,
HEINRICH HAHN.